US011227428B2

(12) United States Patent
Thurston, III et al.

(10) Patent No.: US 11,227,428 B2
(45) Date of Patent: *Jan. 18, 2022

(54) MODIFICATION OF A LIVE-ACTION VIDEO RECORDING USING VOLUMETRIC SCENE RECONSTRUCTION TO REPLACE A DESIGNATED REGION

(71) Applicant: Weta Digital Limited, Wllington (NZ)

(72) Inventors: Kimball D. Thurston, III, Wellington (NZ); Peter M. Hillman, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,333

(22) Filed: May 21, 2021

(65) Prior Publication Data
US 2021/0287424 A1   Sep. 16, 2021

Related U.S. Application Data

(63) Continuation of application No. 17/148,411, filed on Jan. 13, 2021, now Pat. No. 11,055,900, which is a
(Continued)

(51) Int. Cl.
*G06T 15/08* (2011.01)
*H04N 13/122* (2018.01)
(Continued)

(52) U.S. Cl.
CPC ............ *G06T 15/08* (2013.01); *G06K 9/6202* (2013.01); *G06T 15/06* (2013.01); *H04N 13/122* (2018.05);
(Continued)

(58) Field of Classification Search
CPC . G06T 7/70; G06T 15/80; G06T 2207/20021; G06T 2207/20076;
(Continued)

(56) References Cited

U.S. PATENT DOCUMENTS 6,057,859 A   5/2000   Handelman
9,336,602 B1  5/2016   Chang
(Continued)

FOREIGN PATENT DOCUMENTS

WO   WO-2018/146558 A2   8/2018
WO   WO-2019/079752 A1   4/2019
WO   PCT/NZ2021/050020    2/2021

OTHER PUBLICATIONS

Diego Ortin et al: "Occlusion-Free Image Generation for Realistic Texture Mapping", Interational Archives of the Photogrammetry. Remote Sensing and Spatial Information Sciences., May 8, 2012 (May 8, 2012), XP055762571, Retrieved from the Internet: URL:http://citeseerx.ist.psu.edu/viewdoc/download?doi=10.1.1.70.9379&rep=repl&type=pdf.
(Continued)

*Primary Examiner* — Ming Wu
(74) *Attorney, Agent, or Firm* — Trellis IP Law Group, PC (57) ABSTRACT

A main video sequence of a live action scene is captured along with ancillary device data to provide corresponding volumetric information about the scene. The volumetric data can then be used to visually remove or replace objects in the main video sequence. A removed object is replaced by the view that would have been captured by the main video sequence had the removed object not been present in the live action scene at the time of capturing.

17 Claims, 7 Drawing Sheets

Related U.S. Application Data continuation of application No. 17/018,943, filed on Sep. 11, 2020.

(60) Provisional application No. 62/983,530, filed on Feb. 28, 2020.

(51) Int. Cl.
  *G06K 9/62* (2006.01)
  *G06T 15/06* (2011.01)
  *H04N 13/00* (2018.01)

(52) U.S. Cl.
  CPC .............. *H04N 2013/0077* (2013.01); *H04N 2013/0088* (2013.01)

(58) Field of Classification Search
  CPC ......... G06T 2207/20221; G06T 19/006; G06T 2207/30244; G06T 2207/30261
  See application file for complete search history.

(56) References Cited

U.S. PATENT DOCUMENTS

| | | | |
|---|---|---|---|
| 9,378,575 B1 | 6/2016 | Talbot et al. | |
| 9,392,264 B1 | 7/2016 | Chang | |
| 9,947,108 B1 | 4/2018 | Chen | |
| 2010/0060793 A1 | 3/2010 | Oz | |
| 2011/0293142 A1 | 12/2011 | Van Der Mark | |
| 2013/0194392 A1* | 8/2013 | Qi | G06T 7/564 348/50 |
| 2016/0253809 A1* | 9/2016 | Cole | H04N 13/139 345/672 |
| 2016/0314593 A1* | 10/2016 | Metzler | G01C 15/002 |
| 2017/0289623 A1* | 10/2017 | Bailey | G06K 9/6201 |
| 2017/0294006 A1 | 10/2017 | Cabral | |
| 2017/0359523 A1 | 12/2017 | Rubinstein | |
| 2018/0089903 A1* | 3/2018 | Pang | H04N 19/31 |
| 2018/0189974 A1 | 7/2018 | Clark et al. | |
| 2018/0336669 A1* | 11/2018 | Mertens | H04N 5/445 |
| 2018/0350136 A1 | 12/2018 | Rowley | |
| 2020/0019921 A1* | 1/2020 | Buibas | G06Q 10/087 |
| 2021/0042950 A1 | 2/2021 | Wantland | |

OTHER PUBLICATIONS

Jaeho Lee et al: "Removing foreground objects by using depth information from multi-view images", Proceedings of SPIE, vol. 6696, Sep. 13, 2007 (Sep. 13, 2007).

S'anchez-S'aez et al, "Confidence Measures for Error Discrimination in an Interactive Predictive Parsing Framework", 2010 (Year:2010).

Matsuyama et al. "Multi-Camera Systems for 3D Video Production." 3D Video and its Applications. Springer, London, 2012. 17-44. (Year: 2012).

Diego Ortin et al: "Occlusion-Free Image Generation for Realistic Texture Mapping," International Archives of the Photogrammetry. Remote Sensing and Spatial Information Sciences., May 8, 2012 [May 8, 2012], XP055762571, Retrieved from the Internet: URL: http://citeseerx.ist.psu.edu/viewdoc/download?doi=10.1.1.70.9379 &rep=repl&typr=pdf.

Non-Patent Literature; Written Opinion of the International Search Report for International Application No. PCT/NZ2021/050008 filed Jan. 28, 2021; 9 Pages.

\* cited by examiner

MODIFICATION OF A LIVE-ACTION VIDEO RECORDING USING VOLUMETRIC SCENE RECONSTRUCTION TO REPLACE A DESIGNATED REGION

CROSS REFERENCES TO RELATED APPLICATIONS

This application is a continuation of U.S. patent application Ser. No. 17/148,411, entitled COMPUTER-GENERATED IMAGE PROCESSING INCLUDING VOLUMETRIC SCENE RECONSTRUCTION TO REPLACE A DESIGNATED REGION, filed on Jan. 13, 2021 (WD0008CT1) U.S. patent application Ser. No. 17/018,943, entitled COMPUTER-GENERATED IMAGE PROCESSING INCLUDING VOLUMETRIC SCENE RECONSTRUCTION, filed on Sep. 11, 2020 (WD0008US1), which claims the benefit of U.S. Provisional Patent Application Serial No. U.S. Provisional Patent Application Ser. No. 62/983,530, entitled COMPUTER-GENERATED IMAGE PROCESSING INCLUDING VOLUMETRIC SCENE RECONSTRUCTION, filed on Feb. 28, 2020, which is hereby incorporated by reference as if set forth in full in this application for all purposes.

This application is related to the following applications which are hereby incorporated by, reference as if set forth in full in this application for all purposes:

U.S. patent application Ser. No. 17/018,960, entitled IMAGE PROCESSING FOR REDUCING ARTIFACTS CAUSED BY REMOVAL OF SCENE ELEMENTS FROM IMAGES (WD0005US1), filed on Sep. 11, 2020;

U.S. patent application Ser. No. 17/018,933, entitled RECONSTRUCTION OF OBSCURED VIEWS OF CAPTURED IMAGERY USING ARBITRARY CAPTURED INPUTS (WD0006US1), filed on Sep. 11, 2020; and U.S. patent application Ser. No. 17/018,948, entitled RECONSTRUCTION OF OBSCURED VIEWS IN CAPTURED IMAGERY USING PIXEL REPLACEMENT FROM SECONDARY IMAGERY (WD0009US1), filed on Sep. 11, 2020.

FIELD OF THE INVENTION

The present disclosure generally relates to digital image manipulation. The disclosure relates more particularly to apparatus and techniques for reconstructing frames of video or still images captured of a scene using volumetric data captured of the scene.

BACKGROUND

In modern digital imagery creation (still images, video sequences of frames of images), there is often a desire to change from what is captured by a camera to convey something different. This might be the case where a camera captures a scene in which two actors are acting and later a content creator determines that the presence of one of the actors is to be removed from the captured video to result in a video sequence where the removed actor is not present and instead the video sequence shows what was behind the removed actor, a computer-generated character or object takes the place of the removed actor, or for other reasons.

Viewer expectations are that artifacts of the removal from a captured video sequence not be readily apparent. Simply removing the pixels corresponding to the removed character would leave a blank spot in the video. Simply replacing those pixels with a generic background would leave artifacts at the boundary between pixels that were part of the removed character and pixels nearby. With sufficient time, effort and computing power, an artist might manually "paint" the pixels in each frame of the video where the removed character was, but that can be time consuming and tedious to get it to where viewers do not perceive an artifact of the removal.

Tools for more simply performing manipulation of imagery data would be useful.

SUMMARY

An imagery processing system determines pixel color values for pixels of captured imagery from volumetric data, providing alternative pixel color values. A main imagery capture device, such as a camera, captures main imagery such as still images and/or video sequences, of a live action scene. Alternative devices capture imagery of the live action scene, in some spectra and form, and capture information related to pixel color values for multiple depths of a scene, which can be processed to provide reconstruction of an image of the scene whereby a designated region can be replaced so as to, for example, remove an actor or object in the scene.

By replacing pixels in the main imagery by selecting among volumetrically generated alternatives, plates or views can be reconstructed to include portions of objects in the live action scene that were obscured in what was captured as part of the main imagery.

An embodiment provides a computer-implemented method of processing images from a main imaging device using capture device inputs from capture devices, the method comprising: obtaining a main video sequence using a main camera, wherein the main video sequence comprises a main pixel array derived from a view of a live action scene; obtaining, concurrently with obtaining the main video sequence, additional video data of the live action scene from ancillary devices, wherein the ancillary devices are positioned such that at least one ancillary device captures visual information from at least one obscured object, wherein the obscured object is obscured, at least in part, from view of the main camera by a primary object; determining a three-dimensional position of an ancillary device providing at least a portion of the additional data; and mapping the additional data into corresponding volumetric data according to main camera rays from the main camera to objects in the main image.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include generating modified video from captured video of a scene and additional inputs related to the scene, where the modified video is digitally modified to replace all or portions of objects in the scene recorded in the captured video (i.e., "original video"). It should be understood that examples described with reference to video sequences can apply to single or still images, unless otherwise indicated. A scene might comprise various objects and actors appearing in the scene, possibly moving, possibly being subject to lighting changes and/or camera movements. Herein, where an object is described as including an object that is visible in the scene or not visible in the scene, the teaching might also apply to human and/or non-human actors. Thus, a step in a process that captures an image of a scene and then processes the digitally captured video to remove an actor from the scene and reconstruct what was supposed to be behind that actor might also be used for removing inanimate or non-actor objects from the scene.

Rationales for modifying a video post-capture can vary and many of the techniques described herein work well regardless of the rationale. One rationale is that a scene is to be captured with three actors interacting where one of the actors is outfitted with motion capture ("mo-cap") fiducials (contrasting markers, paint, etc.) and the modified video will have a computer-generated character moving in the scene in place of the mo-cap actor, such as where the computer-generated character is a non-human character. Another rationale might be that a video of a scene is captured and in post-production, a director changes a plot and that change requires that some character or object not be present even though it is present in the original captured imagery. Yet another rationale is the discovery of filming errors that need to be corrected and a scene cannot be easily reshot.

In an embodiment, in addition to capturing a main camera view (e.g., a hero camera view), other on-set devices capture information about the scene that could be used to determine what might be obscured by objects on the set. Specifically, the hero camera view for an original frame can be considered the result of hero rays passing through pixels in a view frame until they intersect with an object in the scene and the corresponding pixel color value used for that pixel of that frame is the color value of the intersected object. With additional devices, color values can be obtained and stored of objects that would have been intersected in the absence of the object that was intersected. If this additional color value data is stored such that it can be referenced by hero ray and depth, a reconstructed (i.e., "modified") frame might be generated by considering the hero frame and altering the pixel color values to use pixel color values at greater depths along the hero ray. In other words, the color of a pixel is taken from volumetric data to be the color at a different depth along that pixel's ray than what was originally captured by the main camera.

In a more general case, one or more 2D or 3D images are recreated, which could be from a reconstructed plate or a set of normalized, aligned planes from which an image can be reconstructed with objects filled in or removed. A recreation could use a flattened image, a volumetric file representation, or a multiple depth file representation wherein pixels of an image are represented by more than one pixel color value at different depths.

The volumetric data might be generated using data captured by a plurality of devices that are positioned about the scene having different vantage points. Such devices might include witness cameras, Lidar capture devices, cameras/devices looking down from above a scene, camera/devices looking up from below a scene and the like. The volumetric data could also include data about atmospheric effects such as fog that would cause some atmospheric occlusion, and perhaps as a function of depth.

As part of the reconstruction, geometric processing might be done to reflect the fact that the other devices might be placed at quite different angles from the hero camera. With the other devices viewing a scene from quite different angles, otherwise obscured objects can be recorded and depth for those other objects can be obtained.

In a specific example, a scene might be shot with a hero camera capturing a main action, while a witness camera is offset from the main action by 90 degrees relative to the hero camera, such as where the hero camera is pointed horizontally and the witness camera is directly above the main action and pointed downward. The hero camera could be a stereo camera, which could pick up some depth information, but might miss information about elements obscured by closer objects in the scene. In effect, the witness camera can pick up multiple points along each hero ray, including determining where along the hero ray an atmospheric effect begins and ends. This would be useful if, during reconstruction, a near object is to be removed from a scene so that a further object is then visible but fog needs to be added to account for fog in the scene that was between the near object and the further object.

If multiple ancillary devices are used, additional depth information might be obtained and used as part of the volumetric data. For example, the witness cameras can be stereo cameras. If the volumetric data is stored in a format that indexes by depth, a reconstructed scene can be quickly generated from that volumetric data and the main camera video. Depth information can be used to allow a mapping of visual data onto three dimensional models or structures that are captured or otherwise defined within the scene.

Figure 1:
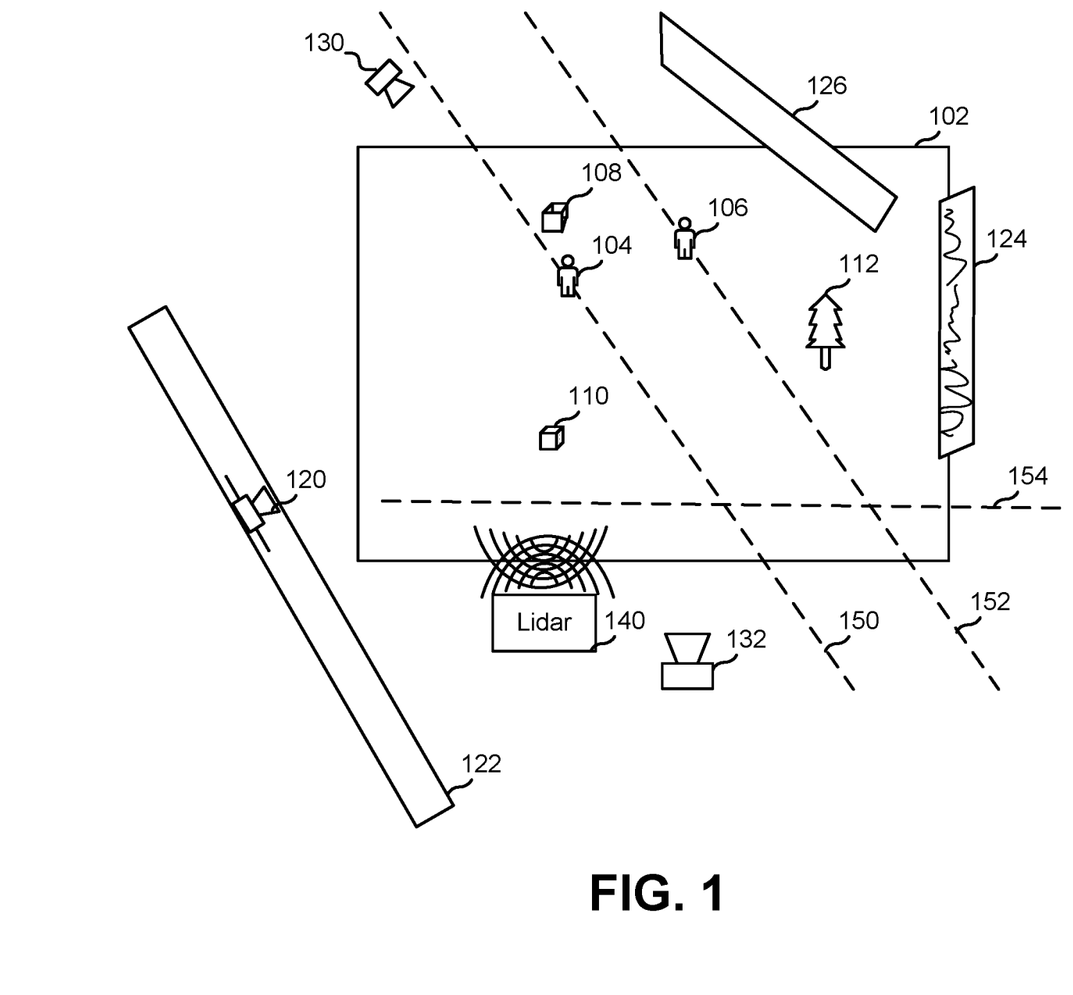
FIG. 1 illustrates an environment in which imagery and data about a scene might be captured, from a top view, according to various embodiments.

FIG. 1 illustrates an environment in which imagery and data about a scene might be captured, from a top view, according to various embodiments and used to capture and process volumetric data about the scene. FIG. 1 is an approximately top view of a stage 102 on which there is present actors 104 and 106 and other objects 108, 110, and 112. Action and the scene might be captured by a camera 120, which might be movable on a track 122. A background wall 124 might provide content of the scene that is captured by camera 120, and a green screen 126 might also be present and visible in the scene. As is known, green screens can be added to scenes to facilitate the insertion of content into a frame where that content does not exist in the scene, but is added post-capture of the scene. Camera 120 might be a main camera, a hero camera, that is expected to capture the bulk of the scene. In some variations, multiple hero cameras are used to allow for cutting from one view of the scene to another quickly.

In the digital video captured by camera 120 (or later digitized video derived from analog filming of the scene), for the indicated position of camera 120 on track 122, actor 106 would be partially obscured in the video by actor 104 and object 110, while background wall 124 is partially obscured by object 112. To provide a director an option to cast the scene without actor 104 or object 112, the director could request that the entire scene be shot a second time without actor 104 and object 112, but often such decisions are not made until after the scene is shot and the actors, objects or environment may no longer be available. Artists could manually paint frames to remove an object, but that can be time consuming to get right.

To provide information for an automated plate reconstruction, additional devices might be deployed on or about stage 102 to gather data that can be used for reconstruction. For example, witness cameras 130, 132 might be deployed to capture black and white, high resolution, low resolution, infrared or other particular wavelengths and resolutions of what is happening in the scene. A Lidar device 140 might also be deployed to capture point clouds of distances to objects. Herein, a plate might be a planar surface (which might or might not relate to a physical surface) that intersects a view space of a camera. In FIG. 1, plates 150, 152 cross the view of camera 120. A plate 154 intersects a view from witness camera 132. Although, in this example, the plates in FIG. 1 are shown perpendicular to a central axis of a view frustum of camera 120, that need not be the case in other applications as plates can have other desired orientations. In some embodiments, a plate can have depth and can define a volume instead of, or in addition to, one or more planar surfaces. In general, operations and properties described herein for two-dimensional images may be applicable to three-dimensional volumes. For example, capturing, manipulating, rendering or otherwise processing two dimensional items, such as images, frames, pixels, etc.; can apply to three-dimensional items such as models, settings, voxels, etc. unless otherwise indicated.

It may be that a director or artist desires to use computerized imagery editing tools to edit captured video from camera 120 such that the plate of interest is plate 152. In that case, editing might involve not only removing pixels from frames that correspond to actor 104, but also filling in pixel color values for those pixels with what would have been captured by camera 120 for those pixels but for the obscuring effects of the opacity of actor 104 and object 110.

Figure 2:
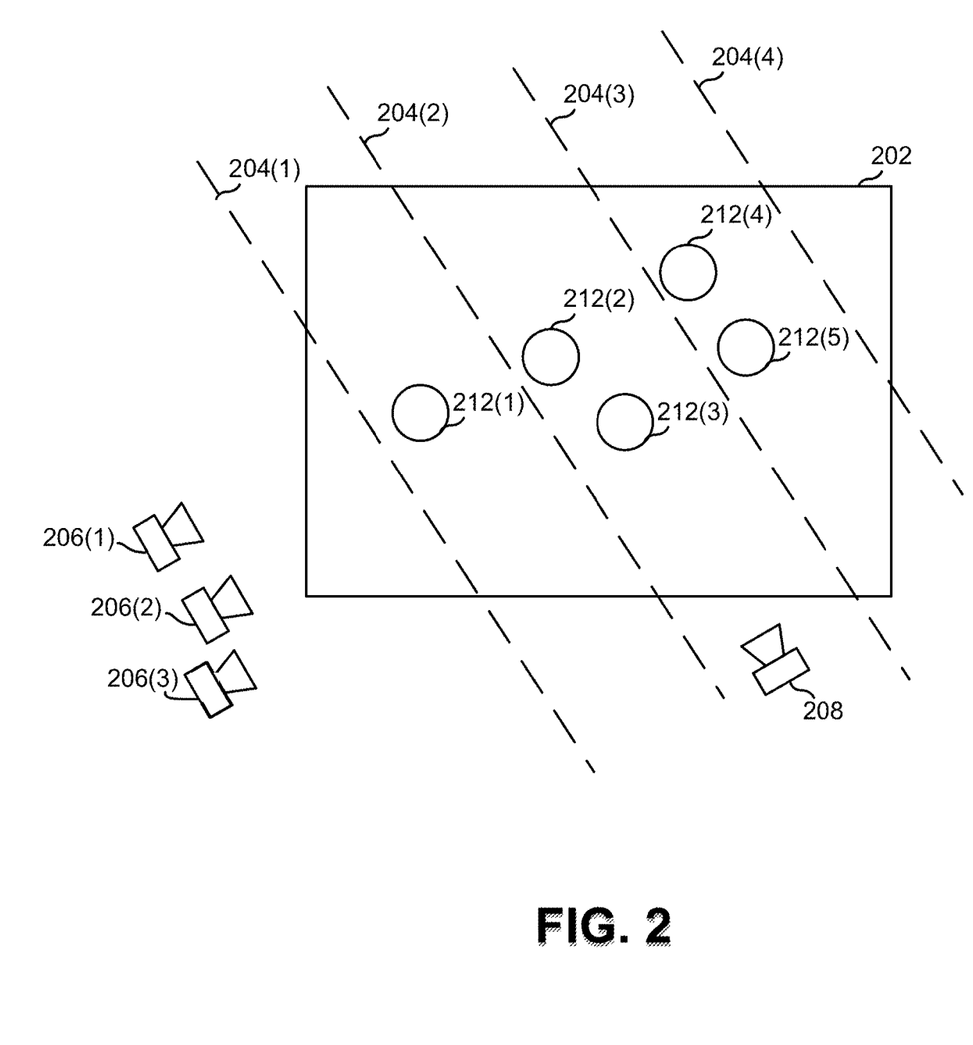
FIG. 2 illustrates a stage, from a top view, in which a scene is captured and has several possible plates of the scene that might be used in generating reconstructed imagery of what would be visible, according to various embodiments.

FIG. 2 illustrates a stage 202, from a top view, in which a scene is captured and has several possible plates 204(1)-(4) of the scene that might be used in generating reconstructed imagery of what would be visible and that uses various cameras. As illustrated, cameras 206(1)-(3) might be identically configured cameras, while camera 208 is configured differently. Such an arrangement, unless existing for other reasons, might make reconstruction impractical, whereas an arrangement of FIG. 1 might not add complexity if the various different capture devices are already in place for other reasons. In FIG. 2, camera 208 might be placed and optimized for motion capture of action on the stage, such as where one or more of objects 212(1)-(5) present on stage 202 is outfitted for motion capture. It can be efficient if inputs from camera 208 could be used for plate reconstruction, but quite often the information gathered, sensitivity, position, lighting, etc. are uncoordinated with those elements of cameras 206(1)-206(3).

Figure 3:
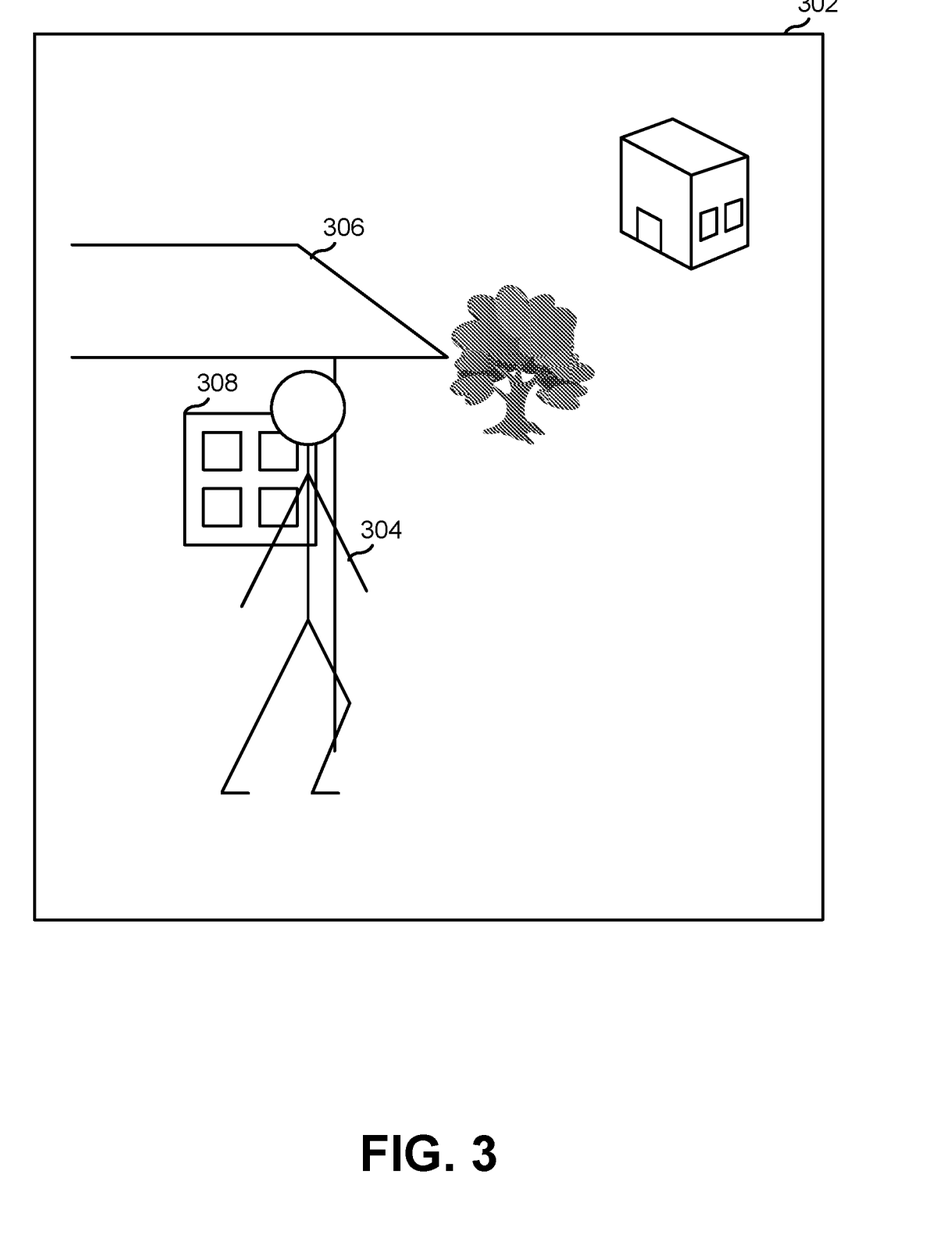
FIG. 3 is a side view of a scene that might include occlusions to be reconstructed, according to various embodiments.

FIG. 3 is a side view of a scene that might include occlusions to be reconstructed. In a captured scene 302, a person 304 is between house 306 and a camera that captured the image. A plate reconstruction process might be used to generate, from a video sequence that includes person 304 walking in front of house 306, a reconstructed video of a plate that is behind person 304 so that, for example, the reconstructed video would display a window 308 on house 306 unobscured by person 304 despite that the main camera did not capture all of the pixels that would make up a view of window 308.

Figure 4:
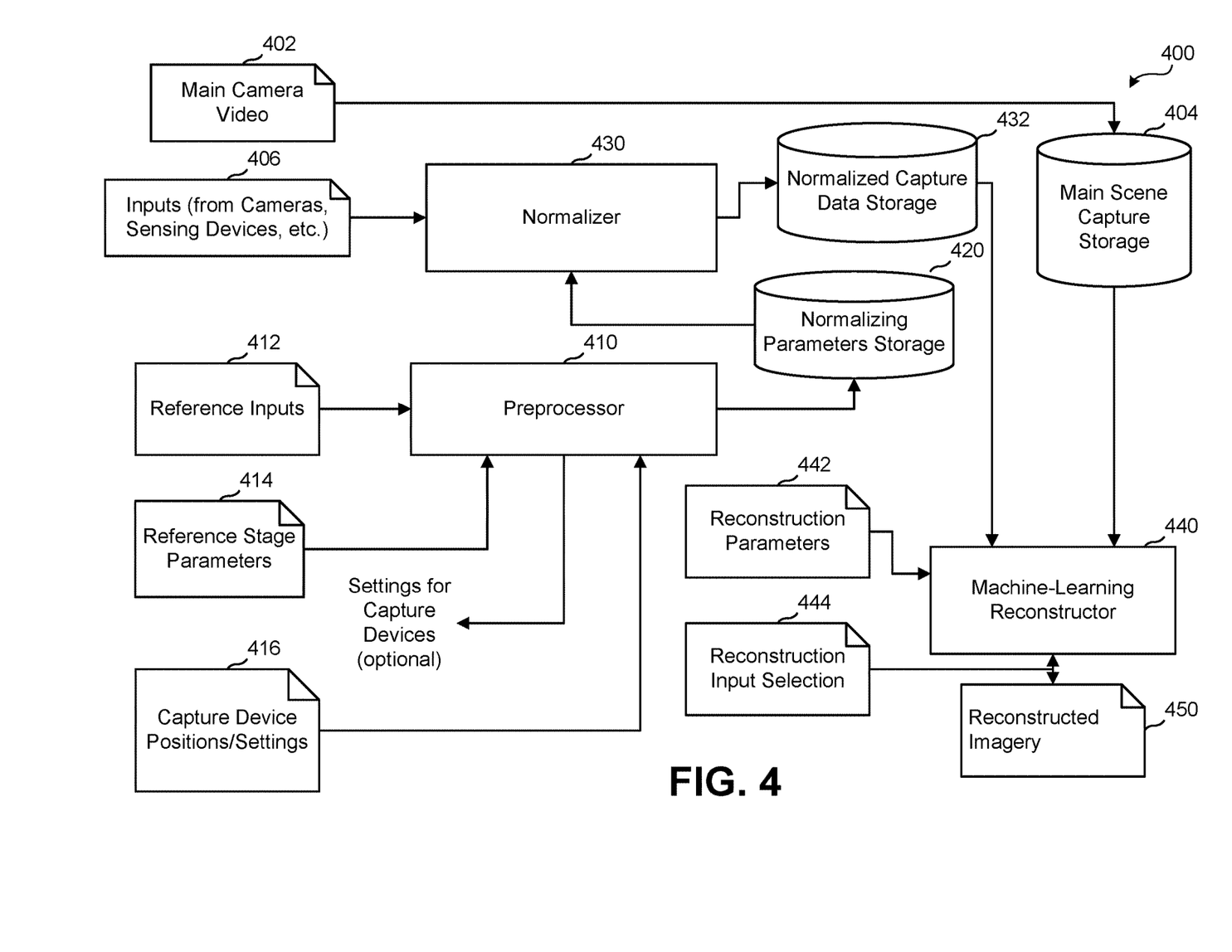
FIG. 4 is a block diagram of a system for creating reconstructed imagery from captured imagery of a scene and arbitrary inputs captured from the scene, according to various embodiments.

FIG. 4 is a block diagram of a system 400 for creating reconstructed imagery from captured imagery of a scene and arbitrary inputs captured from the scene. An advantage of allowing for arbitrary types of input is that preexisting devices or devices added for other purposes can be used for reconstruction. In part, system 400 can be used for reconstructing imagery for captured scenes when editing is done to remove objects from the scene that were present when captured. As illustrated, main camera video 402 is stored into main scene capture storage 404. Arbitrary inputs 406 can be obtained from other capture devices (mo-cap cameras, contrast cameras, stereo capture devices, Lidar, light sensors, environmental sensors, etc.). A preprocessor 410 obtains reference inputs 412, reference stage parameters 414, and capture device positions/settings 416 and processes those to generate normalizing parameters that can be stored in normalizing parameter storage 420.

In some cases, preprocessing and normalization is not needed. For example, where a similar camera is used for a main camera and side cameras, the pixel color values might not need to be normalized. They might need to be translated or transformed linearly or nonlinearly to account for different viewing angles, distances, etc. so that corresponding pixel sets can be identified.

Reference inputs 412 might include capture device readings obtained of a stage in the absence of objects. For example, a Lidar sensor might take readings of a stage to be able to determine distances to fixed backgrounds and the like, while an optical density capture device might measure a quiescent optical density in the absence of activity. Reference stage parameters 414 might include measurements made of the stage itself, such as its lighting independent of a capture device, which capture device positions/settings 416 might include calibration settings and positions of capture devices relative to a stage. It should be understood that the stage need not be a physical stage, but might be some other environment within which a scene to be captured can occur. For example, where a scene is to be shot of actors in battle outdoors, the stage might be an open field and the cameras and sensing devices might be placed relative to that open field to capture the visual action and capture device inputs.

Normalizing parameters are provided to a normalizer 430 that can process the arbitrary inputs 406 to generate normalized inputs, which can be stored in a normalized capture data storage 432. The normalized inputs might be such that they can be used to fill in portions of a stage in a scene that was captured with a main camera that are portions not captured in the main camera imagery due to being obscured by objects that are to be removed from the captured imagery. But one example of normalization would be to modify inputs from another image capture device that was capturing light from the scene while the main camera was capturing the main action, but where lighting, colors, and other factors would result in the other image capture device capturing pixel color values that are not matched with what would have been captured by the main camera for the plate but for the obscuring objects.

Reconstructing a plate from the main camera capture and normalized inputs from other capture devices might not be straightforward. In such cases, a machine-learning reconstructor 440 might take as inputs reconstruction parameters 442, reconstruction input selection 444, normalized capture data from storage 432, and main scene imagery from storage 404. Machine-learning reconstructor 440 might be trained on video with known values for what should be reconstructed. Once trained, machine-learning reconstructor 440 can output, from those inputs, reconstructed imagery 450. In an embodiment, reconstructed (i.e., modified) imagery 450 corresponds to the main camera video 402, but where portions of a scene that were obstructed by objects to be removed are reconstructed so as to appear as if those removed objects were not present in the scene when it was captured.

Figure 5:
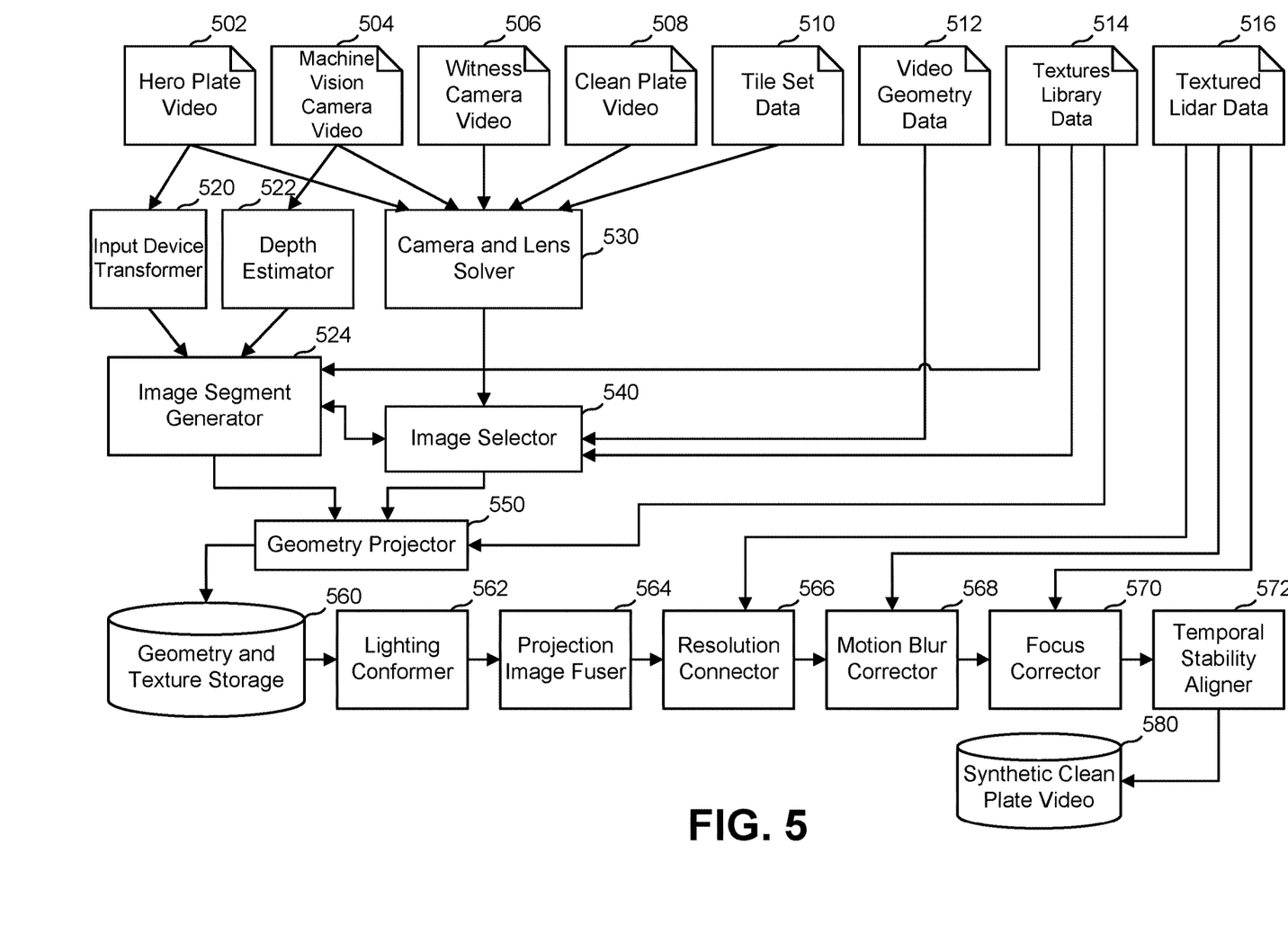
FIG. 5 is a flowchart of a process for processing main imagery inputs and alternative inputs to determine replacement sets of pixel color values derived from those alternative inputs.

FIG. 5 is a flowchart of a pixel replacement process for plate reconstruction (or possibly for other purposes instead or as well). For example, starting with a hero plate video sequence, and inputs from other sources, the process could allow a video editing system to replace pixel color values of a set of pixels (a contiguous region of a view plane, or discontinuous regions) in the hero plate video with pixel color values of a set of alternative pixels, where the alternative pixels have color values representing (or matching) pixel color values that would have occurred in the hero place video sequence but for being obscured by something in the live action scene. In a specific example, an actor is removed from a hero plate video sequence by replacing a set of pixels in frames of the hero plate video sequence with pixels having pixel color values captured by another camera that would have been, or are close to what would have been, the color of pixels capturing an image of a background behind the actor. The process might be used for plate reconstruction from inputs that are not necessarily tied to the details of a camera that is capturing a main view of the scene. The process might be performed by an image processing system or as part of a larger studio content creation system that might comprise a stage, props, cameras, objects on scene, computer processors, storage, and artist and other user interfaces for working with content that is captured within the studio content creation system. In examples below, the process will be described with reference to an imagery creation system capable of capturing images and/or video and modifying the resulting captured imagery, with or without human user input.

As illustrated in FIG. 5, there are a number of inputs. A hero plate video 502 might be in the form of a stored digitized stream from a main camera during a live action scene on a stage (which could be a physical stage, such as a studio, a sound stage, or a logical stage). Other devices that captured varying views of the live action scene to generate alternative imagery, such as a machine vision camera video 504, witness camera video 506, clean plate video 508, tile set data 510, video geometry data 512, textures library data 514, and textured Lidar data 516. Textured Lidar data 516 might provide information about geometry for a set.

As illustrated, hero plate video 502 might be provided to an input device transformer 520 and machine vision camera video 504 might be provided to a depth estimator 522, which would in turn provide their outputs to an image segment generator 524. Image segment generator 524 might use those inputs to determine boundaries of objects, such as moving objects, in the captured main imagery, for later use. Each of hero plate video 502, machine vision camera video 504, witness camera video 506, clean plate video 508, and tile set data 510 might be provided to a camera and lens solver 530 that might transform each of those inputs to account for camera positions, camera zoom, camera pan, and lens distortion, so that there is—at least approximately—some pixel-to-pixel correlation between the main imagery and the alternative imagery. Outputs of camera and lens solver 530 can be provided to an image selector 540.

Machine vision camera video 504 might be obtained from one or more machine vision cameras. These machine vision cameras might be those used for mo-cap and might be deployed in stereo pairs and might be able to provide information for depth recovery and geometry recovery. Machine vision camera video 504 might be color, but might be monochrome.

The input device transformer 520 might provide information as to user masks, such as editor or artist indicators of which areas of frames of the hero plate video 502 are to be excluded (or, potentially, marked as definitely required, so the system will not automatically exclude objects that are in fact desired. The input device transformer 520 might also perform operations to align color processing applied by different kinds of camera, if that is not already handled elsewhere.

Image selector 540 selects from among possible pixel replacements for a selected portion of the main imagery video sequence. Image selector 540 might automatically select a best option, might perform a voting scheme to select a best option, might generate a weighted blend of more than one alternative, or other variation and provide a replacement set of pixels to a geometry projector 550. Image segment generator 524 provides segmentation, such a borders between portions of a main image view that are to be replaced, and the geometry projector 550 can replace those pixels accordingly with corresponding pixel color values from one or more alternative source. Image selector 540 might include a user interface to allow an artist or film editor to select among options, perhaps according to what is most suitable visually.

The geometry projector 550 can store its output into geometry and texture storage 560. Its output might be a reconstructed image, perhaps based on Lidar data and camera parameters for a source image, that comprises what the source image would be if seen by the camera frame. For example, objects that are common between the reconstructed image and the source image might appear in the same place in the frame, even though the cameras were in different positions.

The stored video might or might not be exactly what is needed. It may be that undesirable and/or noticeable artifacts remain. An editor can manually paint to reduce those artifacts, but that can be time-consuming. As illustrated, output from geometry and texture storage 560 can be provided to a lighting conformer 562, that in turn has its output processed by a projection image fuser 564, a resolution connector 566, a motion blur corrector 568, a focus corrector 570, and a temporal stability aligner 572. Resolution connector 566, motion blur corrector 568, and focus corrector 570 might obtain inputs and/or parameters from textured Lidar data

516. An output of temporal stability aligner 572 might be stored as a synthetic clean plate video sequence in storage 580. The synthetic clean plate video sequence might represent the hero plate video with objects appearing to be seamlessly removed from a scene in post-capture editing.

The projection image fuser 564 deals with having multiple images. The geometry projector 560 might be applied separately to every source image, resulting in multiple instances for a frame, perhaps dozens or hundreds of instances. The projection image fuser 564 merges the multiple instances of reconstructed frames and the source frame into a single output frame, which might be a selection of one frame or a function of more than one frame. In one approach, the projection image fuser 564 considers candidate inputs and averages them all together. In another approach, the projection image fuser 564 considers candidate inputs and selects one having a highest rating according to some criteria. In yet another approach, the projection image fuser 564 considers candidate inputs and selects among images on a pixel-by-pixel basis according to some criteria. The image selector 540 might be used to reduce the number of images the projection image fuser 564 (and other elements in the pipeline shown) need to deal with.

The motion blur corrector 568 might add or remove motion blur so that motion blur matches between the image being reconstructed and the source image, e.g., they both would have motion blur or they both will not have motion blur.

The various embodiments further can be implemented in a wide variety of operating environments, which in some cases can include one or more user computers, computing devices or processing devices that can be used to operate any of a number of applications. Such a system also can include a number of workstations running any of a variety of commercially available operating systems and other known applications. These devices also can include virtual devices such as virtual machines, hypervisors and other virtual devices capable of communicating via a network.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
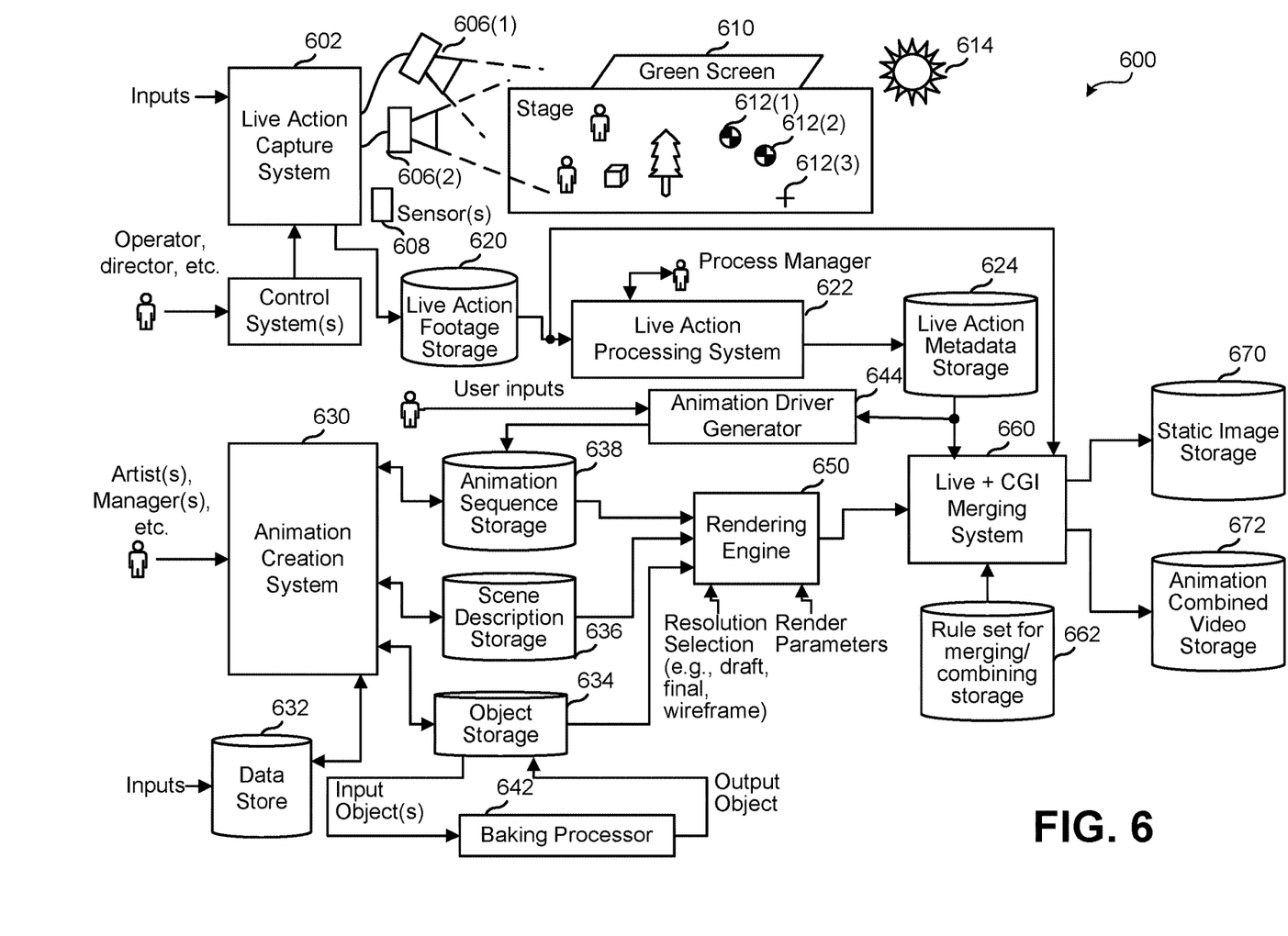
FIG. 6 illustrates an example of visual content generation system as might be used to generate imagery in the form of still images and/or video sequences of images.

For example, FIG. 6 illustrates the example visual content generation system 600 as might be used to generate imagery in the form of still images and/or video sequences of images. The visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows. Images might or might not be stored in a compressed format, but either way, a desired image may be represented as a two-dimensional array of pixel color values. In another variation, images are represented by a pair of stereo images for three-dimensional presentations and in other variations, some of the image output, or all of it, might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. The live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On the stage 604, there might be human actors, animal actors, inanimate objects, background objects, and possibly an object such as a green screen 610 that is designed to be captured in a live scene recording in such a way that it is easily overlaid with computer-generated imagery. The stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, the live action capture system 602 might output live action footage to a live action footage storage 620. A live action processing system 622 might process live action footage to generate data about that live action footage and store that data into a live action metadata storage 624. The live action processing system 622 might include computer processing capabilities, image processing capabilities, one or more processors, program code storage for storing program instructions executable by the one or more processors, as well as user input devices and user output devices, not all of which are shown. The live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 614, as that might be useful in post-processing to match computer-generated lighting on objects that are computer-generated and overlaid on the live action footage. The live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of the visual content generation system 600. The animation creation system 630 might include computer processing capabilities, image processing capabilities, one or more processors, program code storage for storing program instructions executable by the one or more processors, as well as user input devices and user output devices, not all of which are shown. The animation creation system 630 might be used by animation artists, managers, and others to specify details, perhaps programmatically and/or interactively, of imagery to be generated. From user input and data from a database or other data source, indicated as a data store 632, the animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 630 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 632 might be used to drive object presentation. For example, if an artist is creating an animation of a spaceship passing over the surface of the Earth, instead of manually drawing or specifying a coastline, the artist might specify that the animation creation system 630 is to read data from the data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. The animation driver generator 644 might generate corresponding animation parameters to be stored in the animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 622. The animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 650 might include computer processing capabilities, image processing capabilities, one or more processors, program code storage for storing program instructions executable by the one or more processors, as well as user input devices and user output devices, not all of which are shown.

The visual content generation system 600 can also include a merging system 660 that merges live footage with animated content. The live footage might be obtained and input by reading from the live action footage storage 620 to obtain live action footage, by reading from the live action metadata storage 624 to obtain details such as presumed segmentation in captured images segmenting objects in a live action scene from their background (perhaps aided by the fact that the green screen 610 was part of the live action scene), and by obtaining CGI imagery from the rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from the rendering engine 650, and output an image where each pixel is a corresponding pixel from the rendering engine 650 when the corresponding pixel in the live footage is a specific color of green, otherwise output a pixel value from the corresponding pixel in the live footage."

As used herein, the term "pixel value" can include multiple values or other data associated with rendering a pixel. The data can be organized as one or more "channels" such as a separate channels for color values, alpha values, panchromatic pixel definition, shadow map values, etc. The pixel data can be organized into different formats and may be represented by any suitable data structure such as in one or more vectors, arrays, lists, strings, etc.

The merging system 660 might include computer processing capabilities, image processing capabilities, one or more processors, program code storage for storing program instructions executable by the one or more processors, as well as user input devices and user output devices, not all of which are shown. The merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 660, such as modifying boundaries of segmented objects, inserting blurs to smooth out imperfections, or adding other effects. Based on its inputs, the merging system 660 can output an image to be stored in a static image storage 670 and/or a sequence of images in the form of video to be stored in an animated/combined video storage 672.

Thus, as described, the visual content generation system 600 can be used to generate video that combines live action with computer-generated animation using various components and tools, some of which are described in more detail herein. While the visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
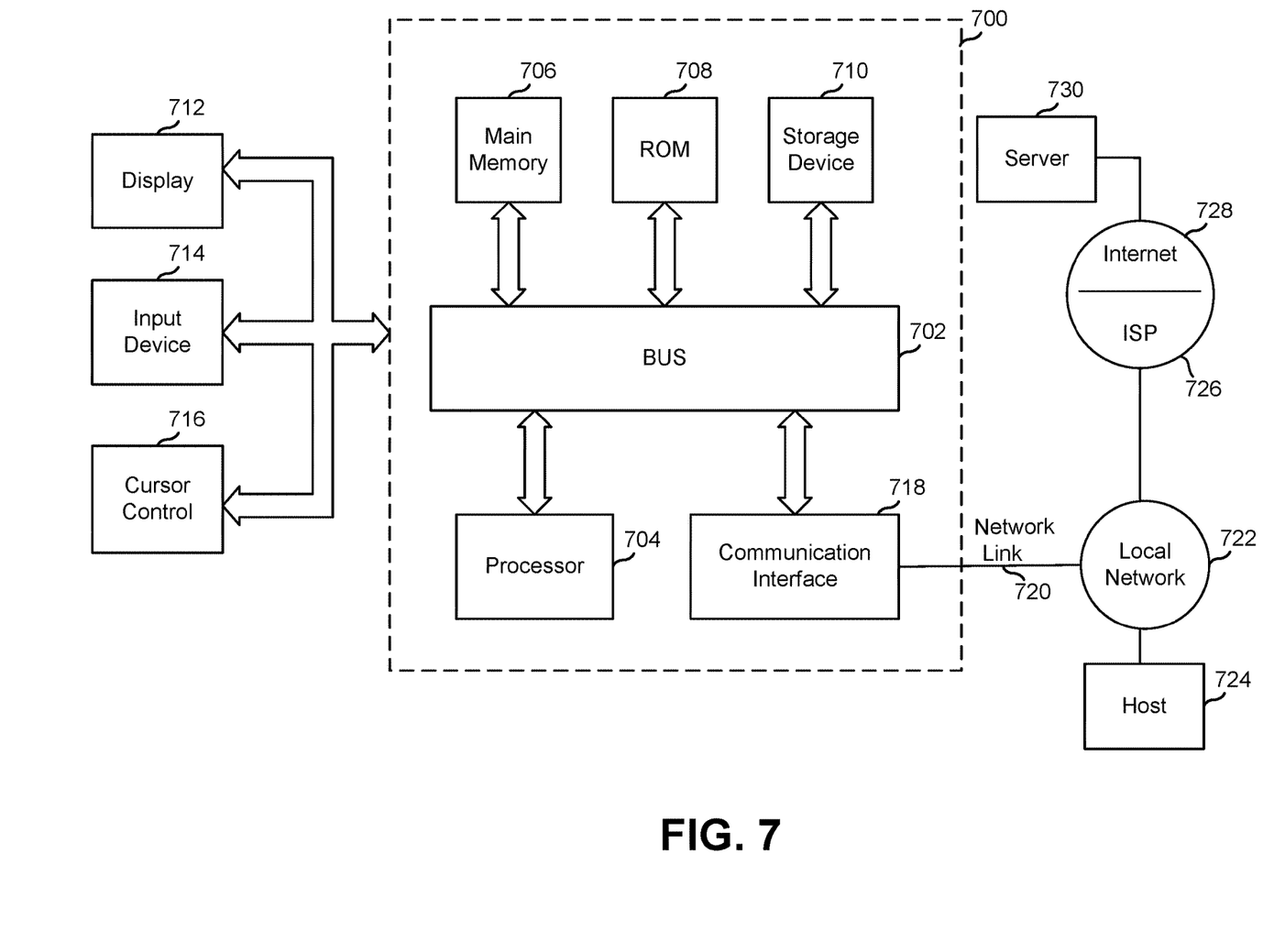
FIG. 7 is a block diagram illustrating an example computer system upon which computer systems of the systems illustrated in FIGS. 1 through 6 may be implemented.

For example, FIG. 7 is a block diagram that illustrates a computer system 700 upon which the computer systems of the systems described herein and/or the visual content generation system 600 (see FIG. 6) may be implemented. The computer system 700 includes a bus 702 or other communication mechanism for communicating information, and a processor 704 coupled with the bus 702 for processing information. The processor 704 may be, for example, a general-purpose microprocessor.

The computer system 700 also includes a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. Such instructions, when stored in non-transitory storage media accessible to the processor 704, render the computer system 700 into a special-purpose machine that is customized to perform the operations specified in the instructions.

The computer system 700 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions.

The computer system 700 may be coupled via the bus 702 to a display 712, such as a computer monitor, for displaying information to a computer user. An input device 714, including alphanumeric and other keys, is coupled to the bus 702 for communicating information and command selections to the processor 704. Another type of user input device is a cursor control 716, such as a mouse, a trackball, or cursor direction keys for communicating direction information and command selections to the processor 704 and for controlling cursor movement on the display 712. This input device typically has two degrees of freedom in two axes, a first axis (e.g., x) and a second axis (e.g., y), that allows the device to specify positions in a plane.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 710. Volatile media includes dynamic memory, such as the main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 702. Transmission media can also take the form of acoustic or light waves, such as those generated during radio-wave and infra-red data communications.

Various forms of media may be involved in carrying one or more sequences of one or more instructions to the processor 704 for execution. For example, the instructions may initially be carried on a magnetic disk or solid-state drive of a remote computer. The remote computer can load the instructions into its dynamic memory and send the instructions over a network connection. A modem or network interface local to the computer system 700 can receive the data. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 provides a two-way data communication coupling to a network link 720 that is connected to a local network 722. For example, the communication interface 718 may be a network card, a modem, a cable modem, or a satellite modem to provide a data communication connection to a corresponding type of telephone line or communications line. Wireless links may also be implemented. In any such implementation, the communication interface 718 sends and receives electrical, electromagnetic, or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP) 726. The ISP 726 in turn provides data communication services through the world-wide packet data communication network now commonly referred to as the "Internet" 728. The local network 722 and Internet 728 both use electrical, electromagnetic, or optical signals that carry digital data streams. The signals through the various networks and the signals on the network link 720 and through the communication interface 718, which carry the digital data to and from the computer system 700, are example forms of transmission media.

The computer system 700 can send messages and receive data, including program code, through the network(s), the network link 720, and communication interface 718. In the Internet example, a server 730 might transmit a requested code for an application program through the Internet 728, ISP 726, local network 722, and communication interface 718. The received code may be executed by the processor 704 as it is received, and/or stored in the storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of processing images from a main imaging device using capture device inputs from capture devices, the method comprising:
    obtaining a main image sequence using a main camera, wherein the main image sequence comprises a main pixel array derived from a view of a live action scene;
    obtaining additional image data of the live action scene from ancillary devices, wherein the ancillary devices are positioned such that at least one ancillary device captures visual information from an obscured object, wherein the obscured object is obscured, at least in part, from view of the main camera by a primary object;
    determining a three-dimensional position of an ancillary device providing at least a portion of the additional image data;
    mapping the additional image data into corresponding volumetric data according to main camera rays from the main camera to objects in the main image sequence;
    providing the main image sequence including the main pixel array and corresponding volumetric data so that when pixels describing the primary object are removed from the main pixel array, they can be replaced by pixels derived from the volumetric data;
    accepting a signal to remove at least a portion of the primary object from the main pixel array;
    selecting one or more corresponding alternative pixel values from the volumetric data; and
    generating a synthetic image comprising a synthetic pixel array wherein pixel color values of the synthetic pixel array are pixel color values of pixels from the main pixel array for portions of the primary object not replaced and are pixel color values of pixels from the volumetric data for replaced portions of the primary object to result in removing the at least a portion of the primary object from the main pixel array while replacing it with at least a portion of the obscured object that would have been captured by the main camera had the at least a portion of the primary object not been in the live action scene.

2. The method of claim 1, wherein the ancillary devices include devices placed on a set at differing angles from the main camera and wherein mapping the additional image data into volumetric data comprises performing geometric transformations to account for differing angles.

3. The method of claim 1, wherein the synthetic image comprises a plurality of discontinuous replacement regions.

4. The method of claim 1, wherein the signal is generated by a user input device.

5. The method of claim 1, wherein the signal is generated by a digital process.

6. The method of claim 1, further comprising:
    obtaining user input for determining which objects in the main image sequence to replace using the volumetric data.

7. The method of claim 1 wherein a pixel value includes two or more channels.

8. The method of claim 7, wherein a channel includes one or more of: a color value, an alpha value, a pan-chromatic definition, or a shadow map value.

9. The method of claim 1, where the replaced portions of the primary object include a two dimensional region.

10. The method of claim 1, where the replaced portions of the primary object include a three dimensional region.

11. The method of claim 1, where the main camera includes a digital camera.

12. The method of claim 1, wherein two or more main cameras are used.

13. The method of claim 12, wherein two stereo main cameras are used.

14. The method of claim 1, where an ancillary device includes one or more of an optical camera, infrared camera, Lidar sensor, sonar sensor, dot flood system.

15. The method of claim 1, where the obscured object is identified at least in part by tracing a ray from a particular capture device along a view line toward an object in the main image sequence.

16. An apparatus comprising:
    one or more processors; and
    logic encoded in one or more tangible non-transitory media for execution by the one or more processors and when executed operable to process images from a main imaging device using capture device inputs from capture devices, comprising the following steps:
obtaining a main image sequence using a main camera, wherein the main image sequence comprises a main pixel array derived from a view of a live action scene;
obtaining additional image data of the live action scene from ancillary devices, wherein the ancillary devices are positioned such that at least one ancillary device captures visual information from an obscured object, wherein the obscured object is obscured, at least in part, from view of the main camera by a primary object;
determining a three-dimensional position of an ancillary device providing at least a portion of the additional image data;
mapping the additional image data into corresponding volumetric data according to main camera rays from the main camera to objects in the main image sequence;
providing the main image sequence including the main pixel array and corresponding volumetric data so that when pixels describing the primary object are removed from the main pixel array, they can be replaced by pixels derived from the volumetric data;
accepting a signal to remove at least a portion of the primary object from the main pixel array;
selecting one or more corresponding alternative pixel values from the volumetric data; and
generating a synthetic image comprising a synthetic pixel array wherein pixel color values of the synthetic pixel array are pixel color values of pixels from the main pixel array for portions of the primary object not replaced and are pixel color values of pixels from the volumetric data for replaced portions of the primary object to result in removing the at least a portion of the primary object from the main pixel array while replacing it with at least a portion of the obscured object that would have been captured by the main camera had the at least a portion of the primary object not been in the live action scene.

17. A non-transitory computer readable medium including one or more instructions executable by one or more processors to process images from a main imaging device using capture device inputs from capture devices, comprising the following steps:
obtaining a main image sequence using a main camera, wherein the main image sequence comprises a main pixel array derived from a view of a live action scene;
obtaining additional image data of the live action scene from ancillary devices, wherein the ancillary devices are positioned such that at least one ancillary device captures visual information from an obscured object, wherein the obscured object is obscured, at least in part, from view of the main camera by a primary object;
determining a three-dimensional position of an ancillary device providing at least a portion of the additional image data;
mapping the additional image data into corresponding volumetric data according to main camera rays from the main camera to objects in the main image sequence;
providing the main image sequence including the main pixel array and corresponding volumetric data so that when pixels describing the primary object are removed from the main pixel array, they can be replaced by pixels derived from the volumetric data;
accepting a signal to remove at least a portion of the primary object from the main pixel array;
selecting one or more corresponding alternative pixel values from the volumetric data; and
generating a synthetic image comprising a synthetic pixel array wherein pixel color values of the synthetic pixel array are pixel color values of pixels from the main pixel array for portions of the primary object not replaced and are pixel color values of pixels from the volumetric data for replaced portions of the primary object to result in removing the at least a portion of the primary object from the main pixel array while replacing it with at least a portion of the obscured object that would have been captured by the main camera had the at least a portion of the primary object not been in the live action scene.

* * * * *